US005959982A

United States Patent [19]
Federkins et al.

[11] Patent Number: 5,959,982
[45] Date of Patent: Sep. 28, 1999

[54] METHOD AND APPARATUS FOR ADAPTING A TIME DIVISION DUPLEX TIMING DEVICE FOR PROPAGATION DELAY

[75] Inventors: John C Federkins, Danville; Namvar Kiaie, Mountain View; Ronald Ross, San Francisco; Karl K Yick, Alameda, all of Calif.

[73] Assignee: Adicom Wireless, Inc., Hayward, Calif.

[21] Appl. No.: 08/920,756

[22] Filed: Aug. 29, 1997

[51] Int. Cl.$^6$ ........................................ H04J 3/06
[52] U.S. Cl. .................. 370/336; 370/350; 370/508; 370/519
[58] Field of Search .................... 370/280, 294, 370/350, 345, 336, 503, 504, 516, 517, 278, 381, 508, 519

[56] References Cited

U.S. PATENT DOCUMENTS

| | | | |
|---|---|---|---|
| 4,435,620 | 3/1984 | Fechalos et al. | 379/287 |
| 5,216,429 | 6/1993 | Nakagawa et al. | 342/45 |
| 5,537,549 | 7/1996 | Gee et al. | 395/200.54 |
| 5,689,502 | 11/1997 | Scott | 370/281 |
| 5,748,621 | 5/1998 | Masuda et al. | 370/337 |

*Primary Examiner*—Jason Chan
*Assistant Examiner*—Jasper Kwoh
*Attorney, Agent, or Firm*—Donald R. Boys

[57] ABSTRACT

A Time Division Duplex (TDD) wireless system utilizes an identical TDD IC engine in both base station and remote stations. In the base station the clock input to the TDD IC is halted once in the middle of each time slice to provide a central guard band between transmit and receive portions that determines the maximum range of the system. At the remote stations clock halts are programmed and utilized to provide guard bands to position transmit and receive portions in each time slice to accommodate propagation delay based on separation of a remote station from the base station. In a preferred embodiment the remote stations determine range to the base and a controller programs clock halts based on the range finding. In one aspect a TDD IC engine is used with a minimum fixed central guard band and a time slice of a first duration at a first clock frequency. Clock frequency is increased and the clock halted to provide increased range at the same time slice duration. The same IC engine at the remote stations is operated at the higher frequency and clock halts used to provide the same time slice duration of the base station and to space the transmit and receive portions of the time slice properly to accommodate propagation delay.

13 Claims, 6 Drawing Sheets

Exemplary TDD Frame Diagram

Fig. 1 (Wireless Local Loop System)

Fig. 2A

Exemplary TDD Frame Diagram

Fig. 2B

Exemplary TDD Frame Diagram

Fig. 2C

TDD Frame Diagram

Fig. 3

Transmission Delay Compensator (TDC)

METHOD AND APPARATUS FOR ADAPTING A TIME DIVISION DUPLEX TIMING DEVICE FOR PROPAGATION DELAY

FIELD OF THE INVENTION

The present invention is in the field of telecommunications and pertains more particularly to wireless radio telephony communication systems.

BACKGROUND OF THE INVENTION

Principally land-based telephony infrastructures are largely in place throughout much of the world and provide telephone communication to most metropolitan and rural areas. Land-based telephony infrastructures vary in many ways from country to country. For example, highly industrialized nations tend to have infrastructures of a superior quality with regards to hardware, lines, and service. Many lesser industrialized nations have infrastructures that utilize older types of equipment and lines that cannot perform as well as state-of-the-art-equipment such as Computer Telephony Integration (CTI) telephony switches, fiber optic lines, and other advanced equipment known in the art. Also, highly industrialized nations are capable of devoting vast resources to insure that telephony infrastructures are upgraded as needed, whereas lesser industrialized nations often do not have the resources available for upgrading an older telephony infrastructure.

In those areas of the world where land-based infrastructure either is marginal or simply doesn't exist, a possible solution is what are known as Wireless Local Loop (WLL) systems. In WLL systems base stations connected by broadband telephony links (trunk lines) to telephony switches in a public or private network are each adapted to maintain duplex audio communication with a plurality of remote client stations which are in turn connected to one or a few telephones. In further description the equipment at a client station is called Customer Premises Equipment (CPE). The range of such systems varies according to design and power, but is generally limited by practicality to a few tens of kilometers at the most for each base station. Still, given a network of base stations, telephone service becomes practical for many remote areas where such service would not otherwise be provided.

Another use of WLL systems is as alternative service in areas that are well-served by existing telephony systems. As deregulation continues and competition is further encouraged, WLL systems find a market even in highly structured telephony markets.

A WLL telephony system, as will be more apparent in the descriptions to follow, is a highly engineered electronic system, supporting duplex audio in digital two-way radio. There are several methods and apparatus known in the art for synchronizing signals in broadcast and reception between a base station and a remote CPE in WLL. Among these systems is a timing system known in the art as Time-Division Duplex (TDD). In a TDD system, as in many others, circuitry at each end of the system (base station and CPE) has to be timed and synchronized in relatively short time slices (typically a few milliseconds) such that the receiving circuitry at one station is listening while the sending circuitry at the other is broadcasting, and vice versa, in each time slice. Moreover, typically the synchronization of signals is a function of the separation of any two transmitting and receiving units.

Also typically in such systems, highly engineered Integrated Circuits (ICs) are used to provide the timing protocol and many other functions for coordinating two-way communication, and there are many such ICs commercially available. Such ICs in the art are often called engines, and that terminology is used herein in some instances. Unfortunately, however, existing circuits tend to be highly proprietary, and are adapted to very particular functions and ranges, and are therefore not very adaptable to new systems and uses. For example, an IC designed for a wireless telephone and providing timing for a Time Division Duplex (TDD) system provides timing and synchronization for stations always quite close, such as within a hundred meters or so. The timing and synchronization functions of such an IC are very similar to those needed for a WLL system, except for range-related phenomena. Unfortunately one may not disassemble such an IC and change the timing internally.

What is clearly needed is a method and apparatus for adjusting functional range for a system using a TDD timing IC having fixed timing functions, so the longer range of a WLL system, and other relatively long range systems, may be accommodated, and stations may be served at many different distances from a base station within a maximum radius.

SUMMARY OF THE INVENTION

In a preferred embodiment of the present invention an adjustable Time Division Duplex (TDD) timer for a communication system is provided, comprising a timer engine IC providing a fixed time slice having fixed duration transmit and receive portions and a fixed duration central guard band at a fixed driving clock frequency; a clock input to the timer engine; and a clock halt signal to the clock input, adapted to halt the clock input when enabled. An adjustable guard band is provided by enabling the clock halt signal at a predetermined time point within the fixed duration guard band in each time slice for a predetermined duration. In some multiple guard bands are provided in sequential time slices by enabling the clock halt signal more than once during each time slice.

In another aspect of the invention a timer engine IC provides a time slice of a first duration with a clock input of a first frequency, and the clock halt signal is used within the first guard band with a clock input at a second frequency higher than the first frequency to provide a guard band of a time duration such that the time slice duration is substantially unchanged at the second frequency. In this aspect the clock halt signal may be used within the central guard band and at each end of each time slice to provide in each slice three guard bands, the guard bands at the beginning and end of each slice being equal in time duration. This management allows transmit and receive portions of the time slice to be adjusted in time to account for propagation delay.

In yet another aspect a Time Delay Compensator (TDC) for a Time Division Duplex (TDD) station is provided, comprising at least one TDD IC engine having a clock input and adapted to provide fixed duration time slices with fixed duration transmit and receive portions and a fixed duration central guard band at a first clock input frequency; a field programmable gate array adapted to provide a repeating clock halt signal to the clock input; and a controller adapted to program the repeating clock halt signal to adjust time duration of clock halts for each time slice provided by the TDD IC engine. In this aspect clock halts are provided by the clock halt signal during the central guard band of successive time slices thereby adjusting guard band duration and time slice duration. In some embodiments clock halts are provided by the clock halt signal during the central guard band and at the beginning and end of each time slice. The TDD station may be a first station in a system including a base station, the TDC further comprising an iterative range finder adapted to determine the range between the TDD station and the base station. In this embodiment the controller employs the range determined to program the repeating clock halt signal in a fashion to provide time slice duration and guard bands to adapt the TDC for communication with the base station.

In still another aspect a wireless communication system is provided comprising a base station comprising a Time Division Duplex (TDD) IC engine adapted to provide successive time slices each having a central guard band dividing the time slice into equal transmit and receive portions; and a second station separated from the base station by a distance imposing a propagation delay time for signals transmitted between the base station and the second station, the second station comprising a TDD IC engine substantially the same as the TDD IC engine of the base station, the TDD IC engine at the second station having a clock input connected to clock halt control circuitry adapted to periodically stop the clock to the TDD IC engine. The clock halt circuitry stops the clock input to provide guard bands in a time slice at the second station spacing transmit and receive portions to accommodate the propagation delay. In some embodiments of the system the clock halt circuitry at the second station is programmable, and further comprises a controller in the second station and an iterative range finder, wherein the range finder determines separation between the base station and the second station, and the controller programs the clock halt circuitry to provide clock halts to the clock input to the TDD IC engine.

In preferred embodiments of the system the central guard band at the base station determines a maximum range for the base station, the system further comprises a plurality of second stations within the maximum range, and each second station determines its separation from the base station and sets its guard bands to accommodate propagation delay for the determined separation.

The wireless communication system is particularly applicable to Wireless Local Loop telephony, but may be used in many other communication systems as well, such as cellular telephone systems.

The invention in various aspects is taught in enabling detail below, and provides for the first time a means of utilizing existing TDD IC engines designed and manufactured for short range communication systems, such as cordless telephones, to be used for relatively longer range systems, such as wireless local loop telephony applications. This newly-provided flexibility shortens the time required for developing a WLL system and minimizes the cost, as well as providing a means of automatically adjusting remote stations in a system for individual propagation delay phenomena proceeding from the fact of different separation from a base station within the range of the base station.

DESCRIPTION OF THE PREFERRED EMBODIMENTS

Figure 1:
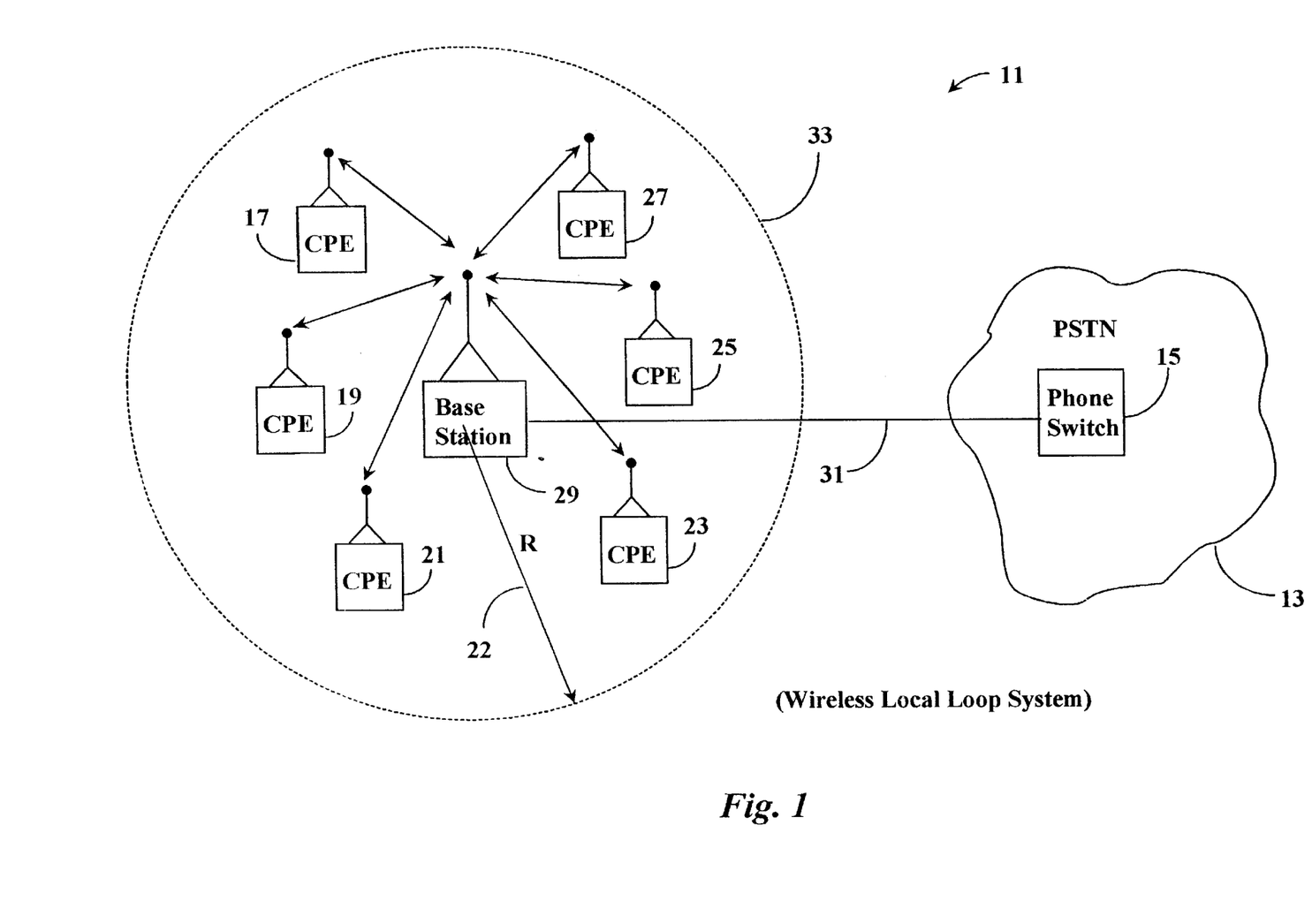
FIG. 1 is a simplified overview of a WLL system according to an embodiment of the present invention.

FIG. 1 is a simplified overview of a WLL system 11 according to an embodiment of the present invention wherein a unique method and apparatus of the present invention is employed to provide TDD protocol communication between a base station 29 and a plurality of CPEs at various distances from the base station, but within a radius R (vector 22) of the base station. The maximum range of base station 29 is indicated in FIG. 1 by dotted perimeter 33.

The teachings of the present invention are particularly applicable to WLL telephony systems, and such systems are used extensively herein as examples of practicing the teachings of the invention. WLL systems, however, are not the sole inventive use, and the teachings may be extended to other wireless communication applications, such as, for example, cellular telephone systems. The use of specific examples herein is not intended to limit the scope of the invention. Further, because of language differences in different arts, different terms may be sometimes used herein to indicate the same entity. For example, in a WLL telephony system a station at a customer's house or business may be called a Customer Premises Equipment (CPE), while in a cellular phone system, the cell phone will be called just that. A base station may sometimes be referred to as a base, and the stations with which the base station communicates may be called second stations, remote stations, remotes, or CPEs, according to the instant context.

It will be apparent to one with skill in the art that there are many natural factors that can affect the range of communication of WLL system 11 such as terrain, weather disturbances, and so on. In actual practice, a communication perimeter is generally regarded as the region within a maximum radius of communication.

Base station 29 is a communication center adapted for communicating via radio signals with a number of CPEs represented by the element numbers 17, 19, 21, 23, 25, and 27. In this embodiment, CPEs represent individual home receiving stations having telephone units. In other embodiments the CPEs could be business units having a plurality of telephones and local telephone equipment connected, as known in the art for business systems.

In this example each CPE 17 comprises a telephone communication device (not shown) and organized circuitry containing necessary components for communication with base station 29, such as a radio receiver, a radio transmitter, TDD timing devices, and the like. Similarly, base station 29 contains all of the required components for communication with deployed CPEs. Base station 29 is connected via a telephony trunk line 31 to a telephony switch 15. Telephony switch 15 is connected to a Public Switched Telephone Network (PSTN) represented by cloud 13 in this particular embodiment. In some systems the telephone network may be a private network or a combination of public and private systems.

WLL systems are well known in the art and may have more or fewer than the 6 CPEs shown in FIG. 1. Six CPEs are deemed adequate by the inventor for the purpose of illustrating the present invention. WLL system 11 may be connected to a telephony network other than a PSTN network without departing from the spirit and scope of the present invention.

Referring again to FIG. 1, TDD timing devices (not shown in FIG. 1, but described in detail below) are present in each CPE such as CPE 17. TDD devices are also present in base station 29 as is known with conventional art. A TDD timing device (TDD), as described with reference to the background section, is a controlling device used to time and synchronize periods of transmission and reception between the base station and an individual CPE to optimize communication at a defined physical separation.

In a preferred embodiment of the present invention, a method and apparatus are provided for manipulating the preset configurations of integrated circuit TDD timing devices, exterior to the device, rendering otherwise inflexible devices adjustable for range.

It will be apparent to the skilled artisan that a WLL system such as system 11 may be implemented with various maximum range, depending on the specific timing control, without departing from the spirit and scope of the present invention. In an exemplary embodiment, described herein, an enhanced WLL system is capable of communication with CPE stations located at various points within a radius from the base of 15 kilometers. In another embodiments, similar systems may be adapted for shorter or longer maximum radius. It is a feature of the present invention that various adjustments in circuitry and operation all external to a TDD of fixed output protocol may be implemented to provide for changes in maximum range and properly timed communication at any point within a maximum range.

Figure 2A:
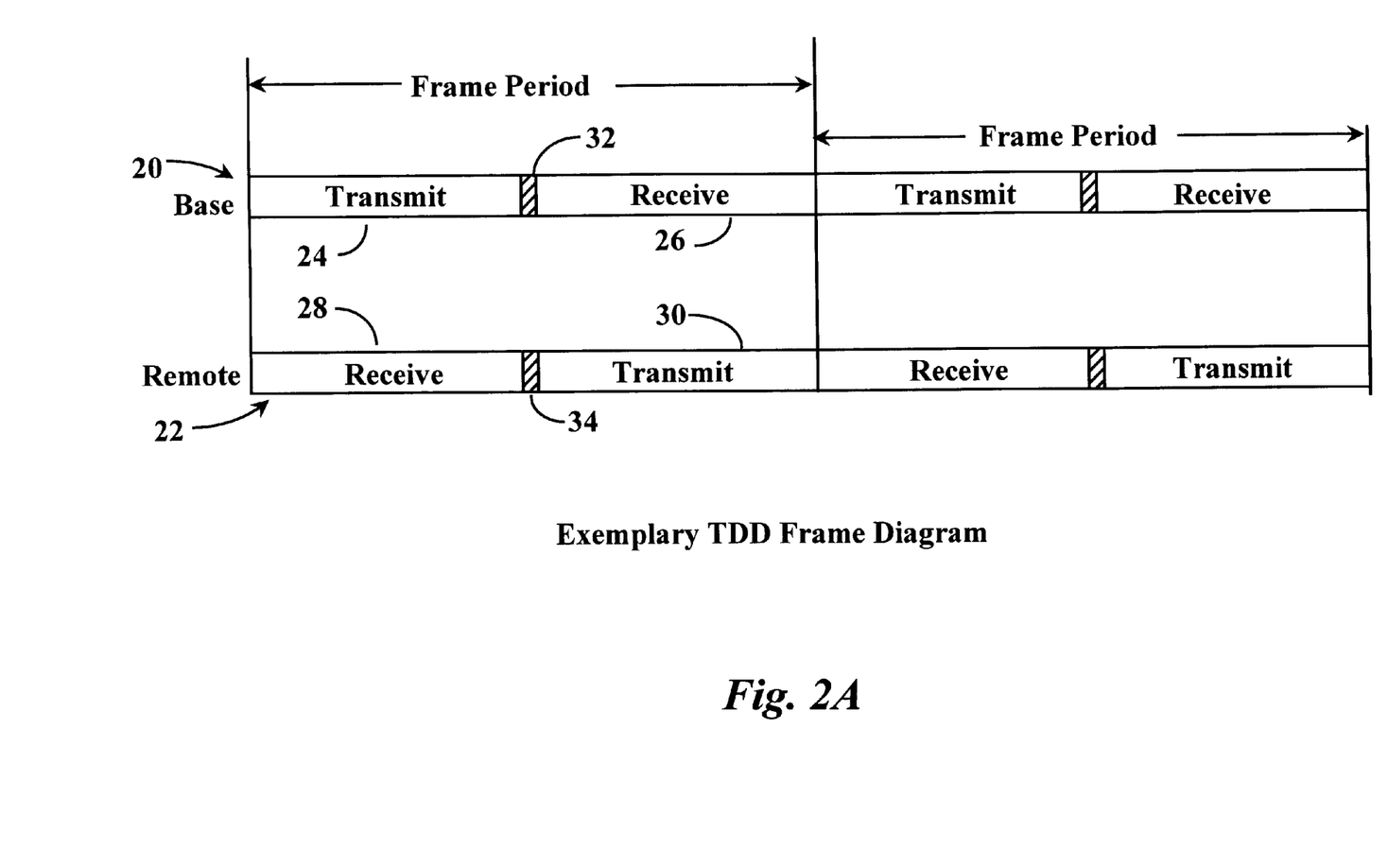
FIG. 2A is an exemplary TDD frame diagram illustrating principals of duplex communication timing for a system of very short range.

FIG. 2A is an exemplary TDD frame diagram provided by a TDD, wherein the device provides timing for a system having a very short range, such as within one hundred yards, as would be the case for a wireless telephone used in a home, for example. A first time track 20 represents timing for a base station is such a system, and a parallel time track 22 represents timing for a CPE unit remote from the base station, in this case a wireless telephone. In each time track there are two frames shown, and within each frame a portion of the total frame time is reserved for transmission and a portion for reception. In the first period for the base there is for example a transmit portion 24 and a receive portion 26. In time track 22 for the remote, there is a transmit portion 30 and a receive portion 28 in each frame period.

In a typical system the frame period is on the order of milliseconds (ms). For a frame period of 8 ms then, in each time slice less than 4 ms would be for transmit and less than 4 ms would be reserved for receive. Over passage of longer periods of time, then, there will be an equal amount of time devoted to transmit and receive.

In such systems there is typically a guard band between transmit and receive, such as guard band 32 shown in the time track for the base in FIG. 2A, and guard band 34 shown for time track 22 for the CPE One purpose of the guard band is to provide for propagation delay.

Track 22 is for a CPE unit to communicate with the base represented by time track 20. During the time that the base transmits it is necessary that the CPE receive, and while the CPE transmits the base must receive. Therefore, the transmit and receive portions are reversed for the base station and the CPE as shown.

For a system of very short range, as shown in FIG. 2A, there is very little propagation delay, so the transmit portion of the base station is shown synonymous in time with the remote station. There need be very little guard band. Theoretically, for zero separation there need be no guard band at all. The guard bands shown in FIG. 2A are, in fact, shown artificially large for the application described.

In a cordless phone system, then, the same timing IC may be used in both the base station and the CPE. In a system of longer separation the time periods for transmit and receive must be offset, as described further below, requiring a larger guard band, and the guard bands, depending on distance (range) will have to be arranged differently for the remote from the base station.

Figure 2B:
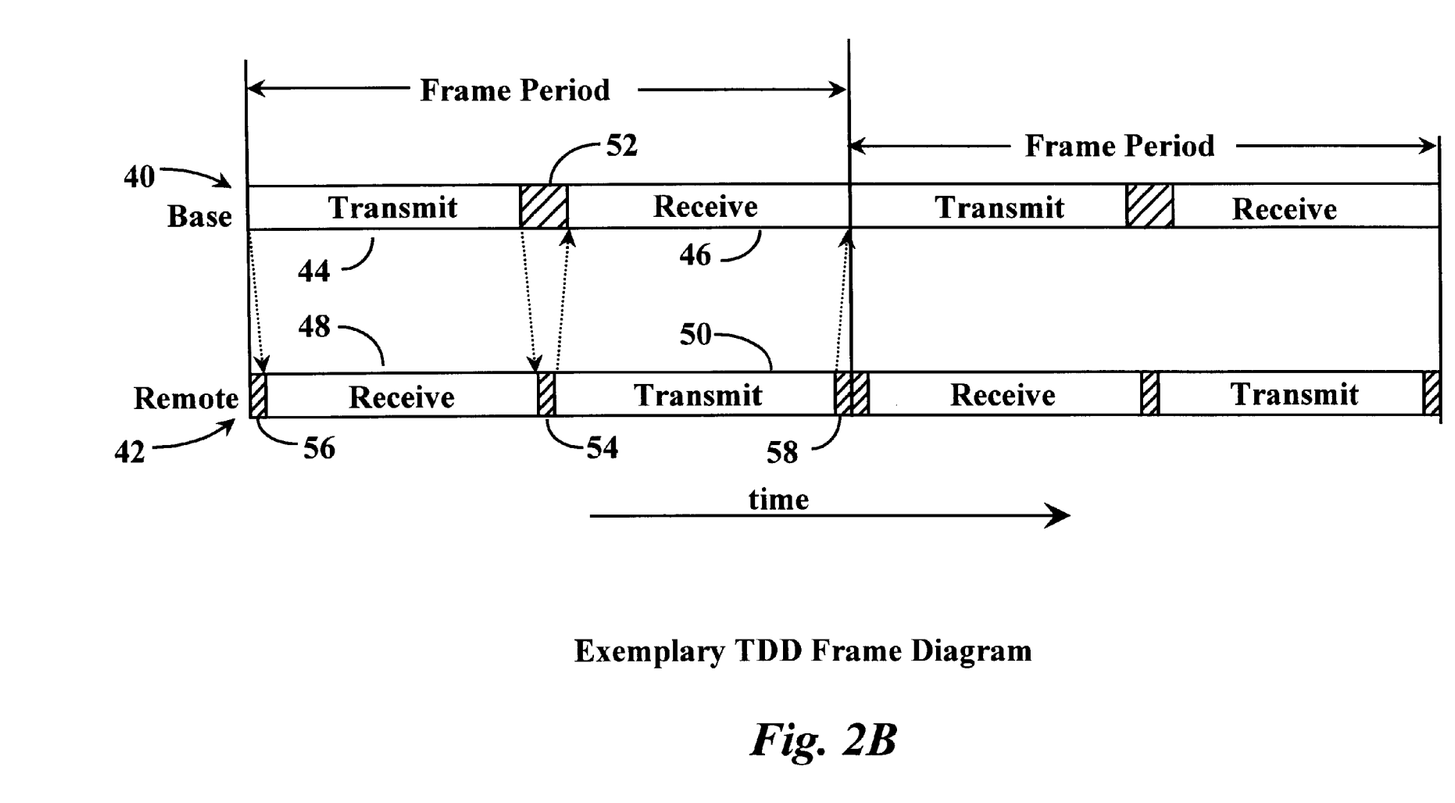
FIG. 2B is a TDD frame diagram illustrating timing for a system of a fixed separation between a base station and a CPE.

FIG. 2B is a frame diagram for a base and a single remote station of significantly longer separation than the very short range system of FIG. 2A. The exact separation is not important to the illustration, but for the sake of example we can say on the order of one kilometer. In this diagram there are, as before, separate transmit and receive portions 44 and 46 respectively for the base time track 40, and 50 and 48 respectively for the remote time track 42.

Note that the transmit and receive portions in each frame between the base and the remote are now noticeably offset, as shown by the angled arrows from the beginning of base transmit to the beginning of remote receive. The time period of the offset between the beginning of base transmit and remote receive is a function primarily of the distance of separation between the base and the remote, and increases with further separation. Note also that for maximum bandwidth the receive portion of each time track needs to be later in time than the associated transmit portion of the opposite time track.

The result of propagation delay is that a guard band 54 in the timing frame for the remote unit will be shorter than the guard band in the timing frame of the base station. The width of the guard band in the base station frame determines the maximum effective range for the system, because as range increases, propagation delay increases proportionally, and the remote guard band has to decrease. Given a fixed guard band for the base frame, at some distance of separation the receive and transmit portions of the remote frame must overlap. This is the maximum effective range for the system.

It is necessary that the total frame period for the base and the remote be the same, and that the transmit and receive portions be of the same time length in such a system for maximum efficiency and bandwidth. Therefore, since the propagation delay for the fixed separation (in this example one kilometer) is defined by the separation, and guard band 54 will be shorter in time than guard band 52 by twice the propagation delay, there needs to be an additional guard band for the remote, so the frame period can be the same as for the base station. In FIG. 2B this addition time is shown as two pieces 56 and 58 at each end of the remote frame. In practice, of course, this guard band becomes one band beginning before the end of one remote frame and ending after the beginning of the next. The time of band 56 is equal to the time of band 58, and time 54+time 56+time 58 is equal to time 52.

It may be seen, then, that conventionally, if a silicon-based timing IC is used to provide fixed frame timing in a TDD system of significant separation, then a different IC needs be designed for each separation. One IC will not serve for a WLL system, as it does for a wireless telephone system of very short range. If an apparatus and method could be provided, however, to adapt the close-range IC for service at longer distances, then available ICs could be used.

Given the IC that provides the timing of FIG. 2A, if one is to alter the output so that the guard band is longer while preserving the time slice (frame period), it will be necessary that the transmission and receive portions are shorter in time. Since these ICs, like all ICs function at a certain clock frequency, one way to shorten the transmit and receive portions would be to provide a faster system clock to the IC. Unfortunately, this alteration will also shrink the guard band and shorten the frame period. The inventors have discovered, however, an apparatus and method wherein the transmit and receive portions may be shortened in time while the guard band may be lengthened, variable guard bands may be provided (CPEs), and the time slice may be kept constant. In so doing, a IC of a single design, such as an IC for a short range wireless telephone, may be incorporated and drive equipment for a WLL system, and the effective range may be adjusted between a base station and individual CPEs at various distances within a maximum effective range for the base station.

Figure 2C:
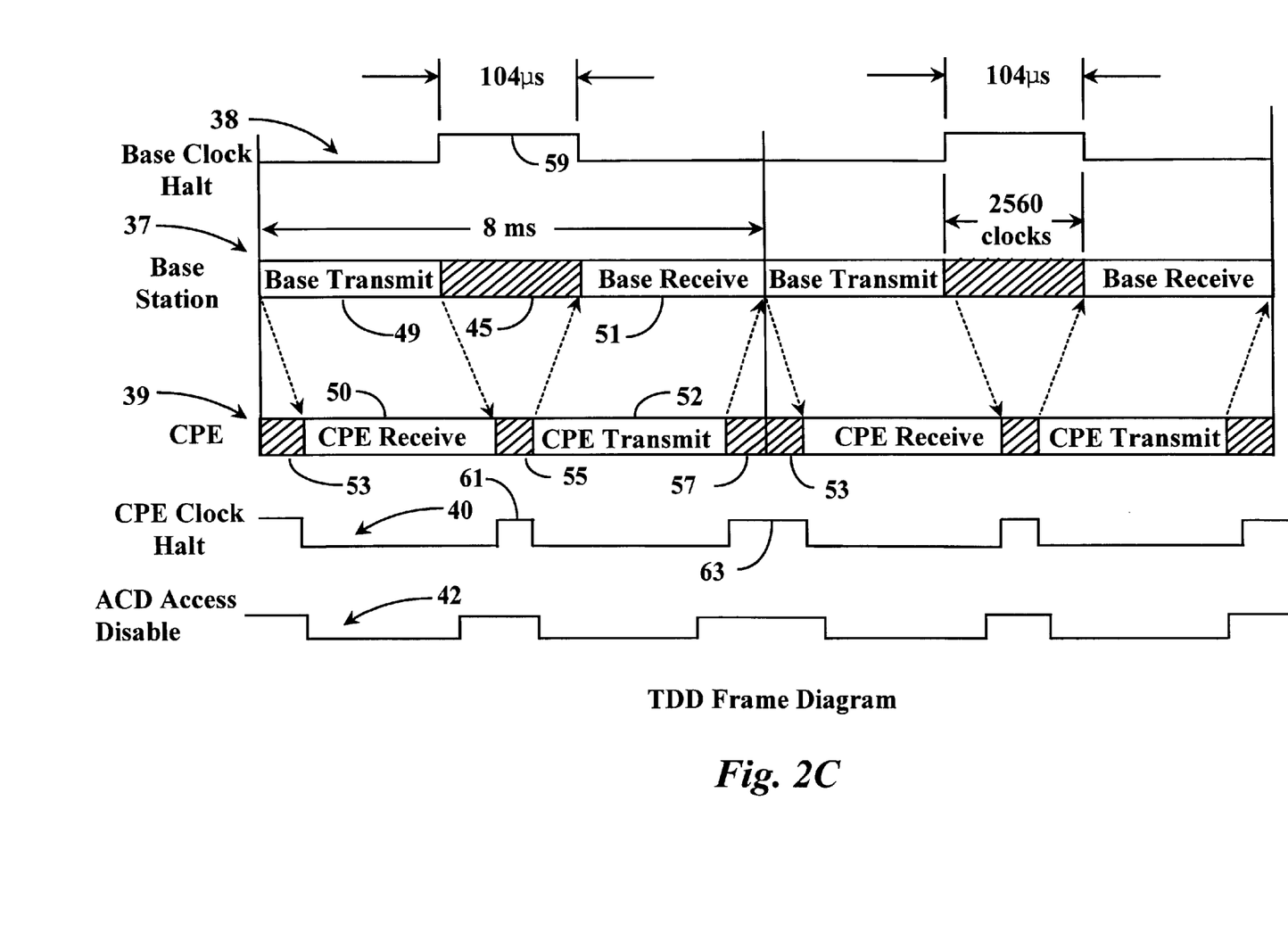
FIG. 2C is a TDD frame diagram for timing provided according to an embodiment of the present invention.

FIG. 2C is a diagrammatic view of an enhanced TDD system according to an embodiment of the present invention, provided by ICs of the sort used to provide the frame diagrams of FIG. 2A, but with external management to extend the effective range, and to synchronize a base station with each of several CPEs at different ranges.

Because of an inherent inability to alter the TDD itself, the method of the present invention must be accomplished outside the IC. In short, this is accomplished in embodiments of the invention by applying a faster system clock frequency to provide shorter transmit and receive portions in a frame, and then halting the system clock at predetermined points in time. Carefully managed clock halt periods are used to provide precisely timed guard band periods at the proper points for both the base station and CPE ends of the system, while keeping the time slice the same at both ends, equal to the original time slice. The system clock is halted only between the transmit and receive portions of a time slice to provide guard bands. In a system wherein one base transmits to several CPEs, the CPE guard bands may be individually tailored to accommodate a specific range for each.

In the embodiment of the invention illustrated by reference to FIG. 2C the TDD used in both the base and the CPE is an IC that provides an 8 ms time slice at a clock frequency of 24.32 MHz, which is 194,560 clock edges during the 8 ms time slice. For this IC it may be assumed there is a zero built-in guard band, just for purposes of illustration. It will be seen in the description to follow that the needed adjustments can be made for any built-in guard band, as long as the time of the guard band is known.

In this embodiment, to increase the range of a system using the TDD to about 15 Km, the system clock is increased in frequency to 24.64 MHz, which is 197,120 clock edges, a difference of 2560 edges. The new clock frequency, with no other changes, decreases the time slice by 2560 edges at 24.64 MHz, or 104 micro seconds ($\mu s$).

In FIG. 2C, time track 37 shows two consecutive timing frames for a base station using the short range engine with the faster clock, and track 38 shows a clock disable signal applied to the faster clock signal to the base station. Base transmit portion 49 and Base Receive portion 51 are no shorter in duration by 52 $\mu s$ each as a result of the clock rate being increased from 24.32 MHz to 24.64 MHz, a total shrinkage of 104 $\mu s$. The clock feed to the TDD is halted in the pattern shown (portion 59 of track 38) for 104 $\mu s$, bringing the time slice (TDD period) back to 8 milliseconds. A guard band 45 of 104 $\mu s$ is created as a result. This guard band is provided in each successive frame for the base station. In may be shown that this guard band is sufficient to provide a range of about 15 kilometers radius for a two-way duplex system.

Track 39 is exemplary for a TDD adapted according to an embodiment of the present invention to be used with one CPE about midway in the 15 km range from the base station. CPE receive portion 50 is seen to be offset forward in time from base transmit portion 49 by the propagation delay for this range. Similarly CPE transmit portion 52 is seen to be retarded in time relative to base station receive portion 51 by the same propagation delay.

The TDD for the exemplary CPE in FIG. 2C is the same IC used for the base station and is driven by the same clock frequency, 24.64 MHz. The transmit and receive portions for the base and the CPE have therefore the same time period, even though they are offset in time. Guard bands for the CPE engine are created by halting the clock feed to the CPE IC according to the pattern of time track 40. Guard band 55 is provided by halt period 61 to have the proper time period for the distance from the base station. If the separation is, for example, 7.5 km and the maximum range is 15 km, the time period of guard band 55 may be expected to be about one-half of the time period of guard band 45 at the base station. In FIG. 2C the scale indicates the range for the CPE is more than one-half the range, as guard band 55 is less than one-half the period of guard band 45.

A second guard band in each TDD frame for the exemplary CPE is provided by a second clock halt period 63 in track 40, positioned to equally span the end of one frame and the beginning of the next. The time period of this band is the difference between the time for band 45 and for band 55. The time slice for the CPE is then the same (in this example 8 ms) as for the base station, and the frames may be synchronized. Considering a single frame at the CPE, the second guard band described above may be considered to be two bands 53 and 57, one at the beginning and the other at the end of the frame. It is clear, though that 53 and 57 are one continuous band considering passage of time.

It will be apparent to the skilled artisan, given the teaching herein, that any number of CPEs may theoretically be deployed within the range radius of the base and adjusted by the apparatus and method described to interact in a two-way TDD system with the base, all of the base and CPE stations using the same TDD, and all having equal time slices with unique guard bands.

Figure 3:
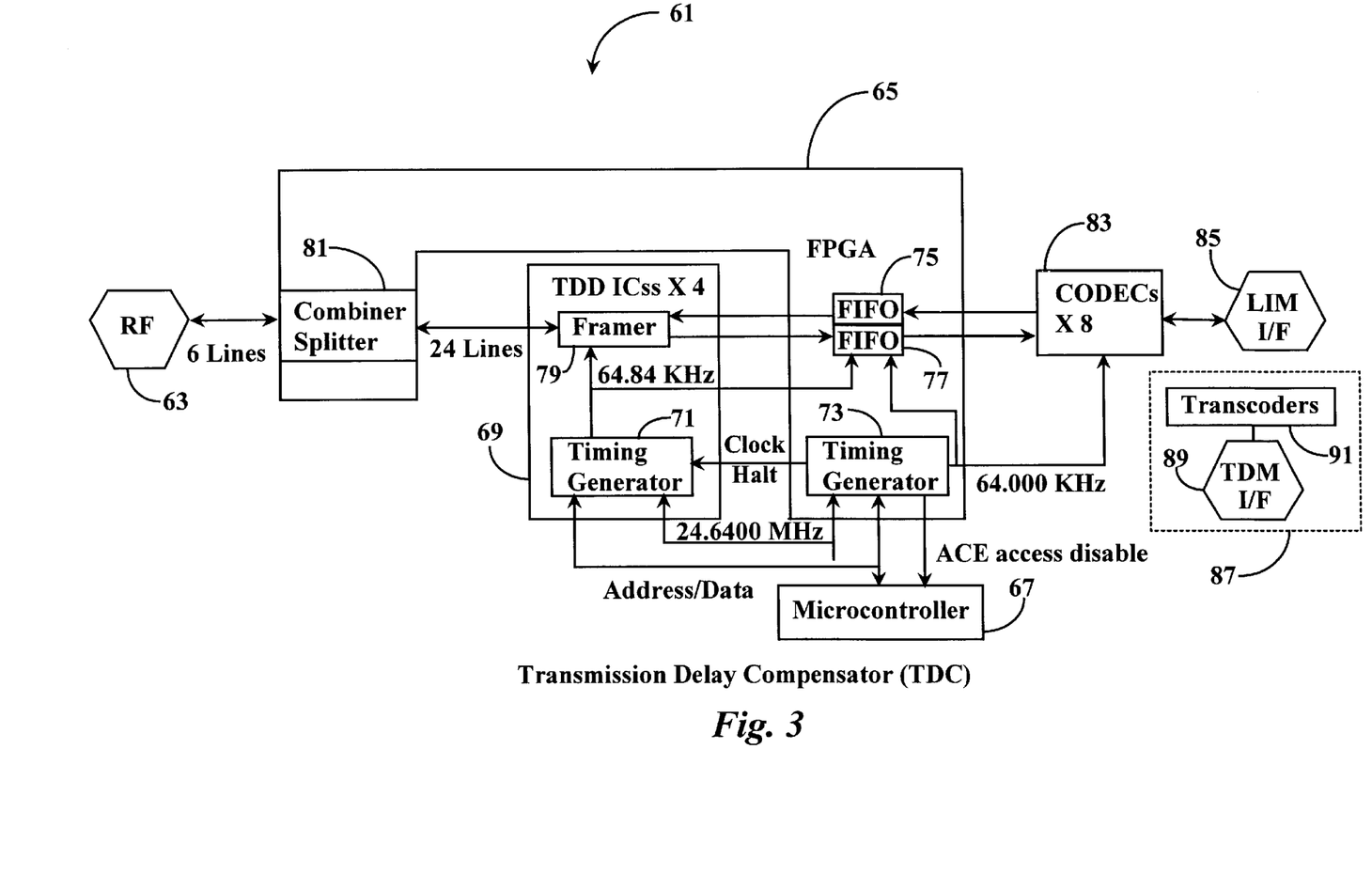
FIG. 3 is a schematic view of a Transmission Delay Compensator (TDC) according to an embodiment of the present invention.

FIG. 3 is a block diagram of circuitry according to an embodiment of the present invention for a Transmission Delay Compensator (TDC) 61 using the method described above. With slight variation TDC 61 is useful for a base station and CPEs. The component differences between a TDC for a base station in a WLL and a CPE are minor, and involve principally interface components. It will be apparent to the skilled artisan that there are a variety of ways commercially available components may be organized to provide a compensator to accomplish the timing and synchronization described.

In a preferred embodiment four TDDs are incorporated in a chip set 69 interfacing by 24 lines to a combiner/splitter 81, which interfaces by 6 lines to RF antenna 63. The ICs are managed as described above by elements of Field-Programmable Gate Array (FPGA) 65, and overall control is exercised by a microcontroller 67.

In this embodiment ADPCM or PCM data is transmitted to and from CODECs 83 at 64.000 Kbps without interruption. A system clock (not shown) provides 24.64 MHz to timing generators 71 (in the chip set) and 73 (in the FPGA).

Timing generator 71 provides 64.84 KHz to framer 79 in the chip set and to two First-In First-Out (FIFO) caches 75. Clock halt signals are provided from FPGA timing generator 73 to generator 71 for providing the guard bands as described in detail above. The FIFOs are for accommodating the slightly different data rate between the FIFOs and the TDDs and between the FIFOs and the CODECs. In the CPE a Line Interface Module (LIM) 85 provides interface between the CODECs and telephone(s) as is known in the art.

Timing generator 73 comprises programmable counters that are aligned to the start and end of the transmit frame by a FRAME_START signal. A software algorithm executed by controller 67 determines appropriate values for programming the counters based on the RSSI and feedback from the base station.

In the base station, as described below, the timing is more simple, as one guard band is implemented for 2560 clock edges at 24.64 MHz. There needs be no range finding or a programming of the counters. In the base station CODECs 83 and LIM I/F 85 are replaced by transcoders 91 and TDM interface 89 as is known in the art and shown in the dotted region 87 in FIG. 3.

With relatively minor changes, then, the TDC of FIG. 3 may be used for a base station and for a plurality of CPEs to which the base station will communicate. When a CPE comes on line, range finding allows the programmable counters to be programmed to provide the necessary guard bands for the individual CPE at the range from the base station.

The TDC of FIG. 3 is exemplary of a TDC for multiple channels, and it will be clear to the skilled artisan, following the teaching provided herein, that similar TDCs may be implemented for one or more channels, and that frequencies and so forth used in the example of FIG. 3 may be changed in other embodiments without departing from the spirit and scope of the invention.

It will also be apparent to one with skill in the art that a CPE such as CPE 17 of FIG. 1 may be packaged as needed and physically located outside of the residence or other customer location without departing from the spirit and scope of the present invention. For example, a CPE such as CPE 17 could be located in a utility box often referred to by those skilled in the art as a first point of entry location. A line could be run from the utility box to the phone unit and so on.

It will further be apparent to one with skill in the art that a transmission delay compensator such as TDC 61 of FIG. 3 may be configured in other ways without departing from the spirit and scope of the present invention. For example, other clock frequencies could be used instead of the frequency illustrated. As another example, TDD frames may be longer or shorter than 8 ms. Different numbers of CODECs and transcoders may be utilized according to differing system requirements. The embodiment described and taught herein is but one of many possible examples.

Figure 4:
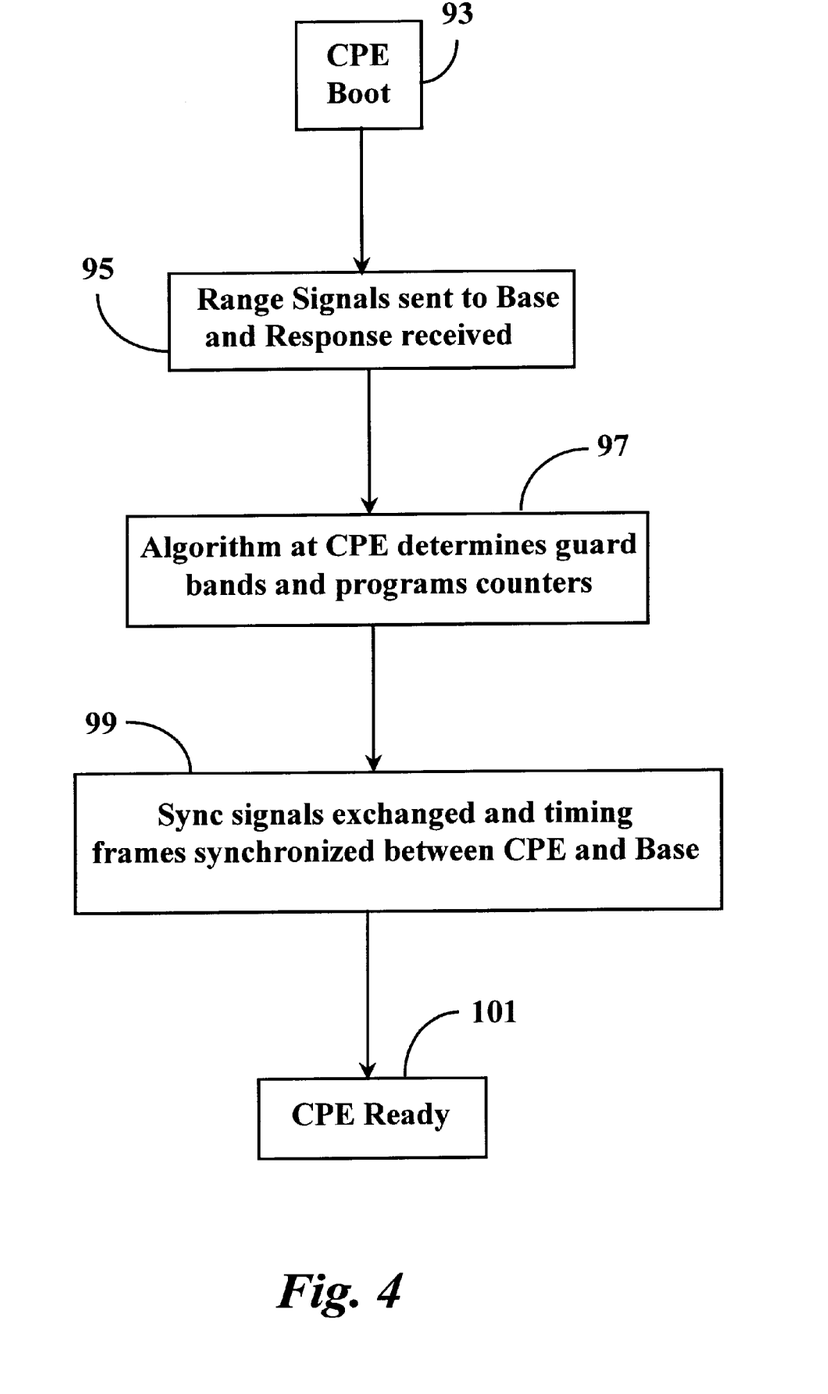
FIG. 4 is a flow chart illustrating a method for automatic range adjustment according to an embodiment of the present invention.

FIG. 4 is a flow diagram depicting steps in bootup of a CPE according to an embodiment of the present invention within the range of an active base station. After a CPE is installed, and whenever there is a power outage and the like, the system at the CPE station has to be booted and reset. At step 93 bootup commences. At step 95 a broadcast signal is sent by the active base, which includes the known guard band (max range) for the base. At step 97 a coded iterative algorithm executed by microcontroller 67 (FIG. 3) determines the distance from the base, appropriate values for timer/counters in the CPE to provide the two guard bands needed at the CPE for TDD timing. These values are programmed into the counters. At step 99 synchronization signals are exchanged between the CPE and the base, allowing the frame timing to be synchronized between the two. At step 101 the CPE is ready for communication.

It will be apparent to one with skill in the art that a CPE such as CPE 17 of FIG. 1 could be placed at any location within the range of a base station, and that the proper distance and propagation delay parameters can be set in automated fashion. It will also be apparent to one with skill in the art that differing frequencies and ranges may be programmed into a WLL system such as WLL system 11 of FIG. 1 without departing from the spirit and scope of the present invention. For example, TDD devices adapted for differing ranges may be utilized with different clock frequency accelerations and differing TDD time slice periods. There are many other alterations that may be made in the exemplary embodiments described herein without departing from the spirit and scope of the invention, many of which have already been described. The invention is limited only by the claims which follow.

What is claimed is:

1. An adjustable Time Division Duplex (TDD) timer for a communication system, comprising:

a timer engine integrated circuit (IC) providing fixed time slices each having fixed duration transmit and receive portions and a fixed duration central guard band at a fixed driving clock frequency;

a clock input to the timer engine; and a clock halt signal to the clock input, adapted to halt the clock input when the clock halt signal is enabled;

wherein an adjustable central guard band is provided by enabling the clock halt signal at a predetermined time point within the fixed duration central guard band in each time slice for a predetermined duration, and wherein the clock halt signal is also used to provide guard bands at each end of each time slice to provide thereby in each time slice three guard bands, the guard bands at the beginning and end of each time slice being equal in time duration.

2. The timer of claim 1 wherein the timer engine IC, given a clock input of a first frequency, provides a time slice of a first duration, and wherein the clock halt signal is used within the central guard band with a clock input at a second frequency higher than the first frequency to maintain the central guard band at the first duration at the higher frequency.

3. A method for adjusting timing for a Time Division Duplex (TDD) IC engine having a first time slice duration and a first duration central guard band separating a transmit and a receive portion at a first clock input frequency, comprising steps of:

(a) providing a second clock input frequency higher than the first clock input frequency; thereby shortening the uninterrupted duration of the time slice and each transmit and receive portion proportionally; and (b) halting the clock input for a predetermined time period during the central guard band, thereby increasing the time duration of the central guard band such that the time slice at the second frequency is equal to the time slice at the first frequency.

4. The method of claim 3 wherein, in step (b) the clock input is halted more than once in each time slice, and at least once outside the central guard band, thereby providing plural guard bands in each time slice.

5. The method of claim 4 wherein, in a time track comprising sequential identical time slices, two guard bands are provided, one central to each time slice, and the other spanning the end and the beginning of adjacent time slices equally.

6. A Time Delay Compensator (TDC) for a Time Division Duplex (TDD) station, comprising:
- at least one TDD integrated circuit (IC) engine having a clock input and adapted to provide fixed duration time slices with fixed duration transmit and receive portions and a fixed duration central guard band at a first clock input frequency;
- a field programmable gate array adapted to provide a repeating clock halt signal to the clock input; wherein the clock input is halted more than once in each time slice, thereby providing plural guard bands in each time slice; and
- a controller adapted to program the repeating clock halt signal to adjust time duration of clock halts for each time slice provided by the TDD IC engine
- wherein clock halts are provided by the clock halt signal during the central guard band and at the beginning and end of each time slice equally thereby adjusting guard band duration and time slice duration.

7. The TDC of claim 6 wherein the TDD station is a first station in a system including a base station, the TDC further comprising an iterative range finder adapted to determine the range between the TDD station and the base station, and wherein the controller employs the range determined to program the repeating clock halt signal in a fashion to provide time slice duration and guard bands to adapt the TDC for communication with the base station.

8. A wireless communication system comprising:
- a base station comprising a Time Division Duplex (TDD) integrated circuit (IC) engine adapted to provide successive time slices each having a central guard band dividing the time slice into equal transmit and receive portions; and
- a second station separated from the base station by a first distance imposing a propagation delay time for signals transmitted between the base station and the second station, the second station comprising a TDD IC engine the same as the TDD IC engine of the base station, the TDD IC engine at the second station having a clock input connected to clock halt control circuitry adapted to periodically stop the clock to the TDD IC engine;
- wherein an adjustable central guard band is provided by enabling the clock halt signal at a predetermined time point within the fixed duration central guard band in each time slice for a predetermined duration, and wherein the clock halt signal is also used to provide guard bands at each end of each time slice to provide thereby in each time slice three guard bands, the guard bands at the beginning and end of each time slice being equal in time duration, thereby offsetting transmit and receive portions in time at the second station from transmit and receive portions at the base station by the time duration of the propagation delay.

9. The wireless communication system of claim 8 wherein the clock halt circuitry at the second station is programmable, and further comprising a controller in the CPE station and an iterative range finder, wherein the range finder determines separation between the base station and the second station, and the controller programs the clock halt circuitry to provide clock halts to the clock input to the TDD IC engine.

10. The wireless communication system of claim 9 wherein the central guard band at the base station determines a maximum range for the base station, and further comprising a plurality of second stations within the maximum range, and wherein each second station determines its separation from the base station and sets its guard bands to accommodate propagation delay for the determined separation.

11. A wireless communication system as in claim 8 wherein the base station is connected to a telephony network and the second station is a Customer Premises Equipment (CPE) comprising at least one telephone.

12. In a wireless communication system comprising a base station separated from a second station by a distance determining a propagation delay, each station operating with a Time Division Duplex (TDD) integrated circuit (IC) engine providing successive time slices each having transmit and receive portions separated by a fixed-duration central guard band, a method for providing and adjusting guard bands at the second station to accommodate the propagation delay, comprising steps of:
- (a) operating an iterative range finder between the stations to determine the separation of the stations; and
- (b) programming a clock halt circuitry in the second station to provide an adjustable central guard band by enabling the clock halt signal at a predetermined time point within the fixed duration guard band in each time slice for a predetermined duration, and guard bands at each end of each time slice to provide in each time slice three guard bands, the guard bands at the beginning and end of each time slice being equal in time duration, thereby offsetting transmit and receive portions in time at the second station from transmit and receive portions at the base station by the time duration of the propagation delay.

13. The method of claim 12 wherein the base station is connected to a telephony network and the second station is a Customer Premises Equipment (CPE) comprising at least one telephone.

* * * * *